United States Patent
Roffe et al.

(10) Patent No.: US 11,892,036 B1
(45) Date of Patent: Feb. 6, 2024

(54) BEARING TRACK CAGE FOR MITIGATING ROLLING ELEMENT EXCURSION

(71) Applicant: Schaeffler Technologies AG & Co. KG, Herzogenaurach (DE)

(72) Inventors: Dennis Roffe, Fort Mill, SC (US); Michael Heaton, Rock Hill, SC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/871,385

(22) Filed: Jul. 22, 2022

(51) Int. Cl.
  *F16C 33/38* (2006.01)
  *F16C 19/16* (2006.01)

(52) U.S. Cl.
  CPC .......... *F16C 33/3881* (2013.01); *F16C 19/16* (2013.01); *F16C 33/3831* (2013.01)

(58) Field of Classification Search
  CPC .. F16C 19/16; F16C 33/3812; F16C 33/3831; F16C 33/3881; F16C 33/4664; F16C 33/3825; F16C 33/4611; F16C 33/506; F16C 33/508
  See application file for complete search history.

(56) References Cited

U.S. PATENT DOCUMENTS

| | | | | |
|---|---|---|---|---|
| 5,082,375 A | * | 1/1992 | Hillmann | F16C 33/3831 384/531 |
| 2012/0167391 A1 | * | 7/2012 | Werner | F16C 33/4611 384/523 |
| 2013/0188900 A1 | * | 7/2013 | Beck | F16C 33/467 384/573 |
| 2015/0063738 A1 | * | 3/2015 | Fox | F16C 33/4611 384/573 |
| 2021/0254665 A1 | * | 8/2021 | Beyfuss | F16C 33/548 |

FOREIGN PATENT DOCUMENTS

JP 58013230 A * 1/1983

OTHER PUBLICATIONS

Machine translation of JP-58013230-A (Year: 1983).*

* cited by examiner

*Primary Examiner* — Alan B Waits
(74) *Attorney, Agent, or Firm* — Volpe Koenig

(57) ABSTRACT

A bearing track cage includes a plurality of retention elements, wherein each retention element includes at least a first axial side and a second axial side, and wherein each adjacent pair of retention elements of the plurality of retention elements defines a rolling element pocket configured to retain a rolling element. A first support is slidably coupled to each of the plurality of retention elements on the first axial side thereof and a second support is slidably coupled to each of the plurality of retention elements on the second axial side thereof.

18 Claims, 4 Drawing Sheets

BEARING TRACK CAGE FOR MITIGATING ROLLING ELEMENT EXCURSION

FIELD OF INVENTION

The present disclosure generally relates to a track cage for rolling bearings for mitigating rolling element excursion, and more specifically to a track cage having supports slidably coupled to individual retention elements.

BACKGROUND

Rolling element excursion is a phenomenon that occurs mainly in ball bearings, but also to a lesser extent in tapered and spherical roller bearings. The condition happens when the rolling elements deviate from their kinematically correct position during rotation and roll ahead or behind the correct position. A reason for this phenomenon is a displacement of the contact points between the rolling elements and the two raceways. This displacement of the contact points occurs when two bearing rings shift and/or tilt against each other due to an external load on the bearing, resulting in the contact angle of the rolling elements to the bearing rings changing. The rolling elements then roll on a different diameter due to the curved or inclined raceway. As a result, the speed of the rolling element around the bearing center is correspondingly lower or higher, which leads to rolling element excursion.

While conventional bearings and bearing components have generally been considered satisfactory for their intended purpose, there is still a need in the art for improved bearing track cages that can better handle external loads and high rotational speeds. The present disclosure provides a solution for this need.

SUMMARY

A bearing track cage for mitigating rolling elements excursion is disclosed herein. The bearing track cage includes a plurality of retention elements, where each retention element includes at least a first axial side and a second axial side. A first support is provided to be slidably coupled to each of the retention elements on the first axial side, and a second support is provided to be slidably coupled to each of the retention elements on the second axial side. Each adjacent pair of retention elements defines a rolling element pocket configured to retain a rolling element therein.

It is also considered that the first axial side and the second axial side of each retention element can include a slot configured to retain a corresponding one of the first support or the second support. Each slot can be larger at an axially inner portion than at an opening thereof defined at an axially outer portion. Each slot can include a curved profile elongated from a first circumferential side of the retention element to a second circumferential side of the retention element.

It is also considered that the plurality of retention elements can contact at least 50% of an outer perimeter of the first support and at least 50% of an outer perimeter of the second support. The plurality of retention elements can contact less than 80% of an outer perimeter of the first support and less than 80% of an outer perimeter of the second support.

It is also considered that a first circumferential side of each of the retention elements can include a first indentation partially defining an adjacent rolling element pocket, and a second circumferential side of each of the plurality of retention elements can include a second indentation also partially defining an adjacent rolling element pocket. The first indentation and the second indentation can contact a radially outer side of each retention element and a radially inner side of each retention element. The first indentation $130a$ and the second indentation $130b$ can each be defined by a spheroidal curve.

It is also considered that the first support and the second support can contact each of the rolling elements. At least one of a radially outer side or a radially inner side of each of the plurality of retention elements can include a cavity or more specifically, the radially outer side can include a first cavity and the radially inner side includes a second cavity. The first support and the second support can each formed from a metal and each retention element can be formed from a plastic material.

A bearing assembly is also disclosed. The bearing assembly includes a plurality of rolling elements, and a plurality of retention elements, where each of the retention elements are located between two adjacent rolling elements. The retention elements are configured to be slidably coupled to at least a first support such that each retention element is configured to shift in a circumferential direction along the first support. The plurality of rolling elements can be free to shift circumferentially within the bearing assembly. Each of the plurality of retention elements can be configured to be slidably coupled to at least a second support. Each of the retention elements can at least partially cover the first support and the second support. Each of the retention elements can at least partially expose the first support and the second support.

These and other features the bearing track cage and the bearing assembly of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the bearing assembly and bearing track cages of the subject disclosure without undue experimentation, embodiments thereof will be described in detail herein below with reference to certain figures, wherein.

DETAILED DESCRIPTION OF THE PREFERRED EMBODIMENTS

Figure 1:
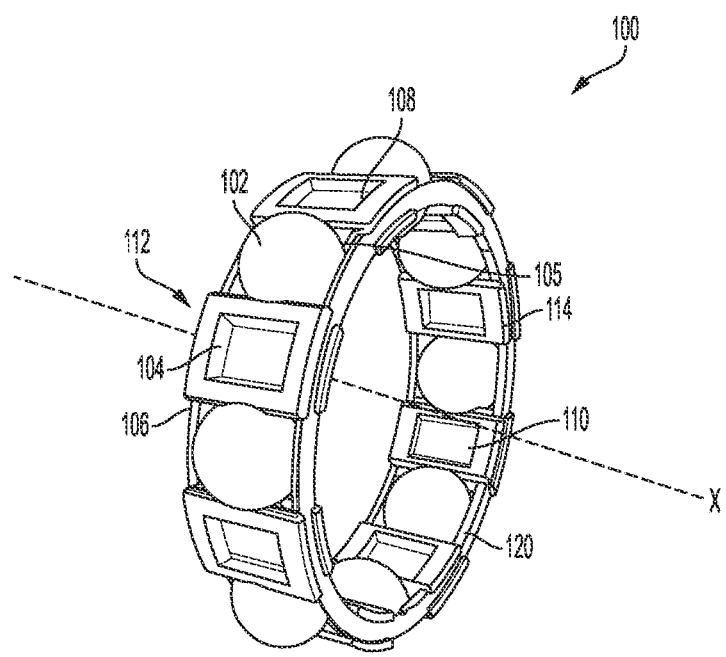
FIG. 1 shows a perspective view of an embodiment of a bearing assembly including rolling elements according to the disclosure.
Figure 2:
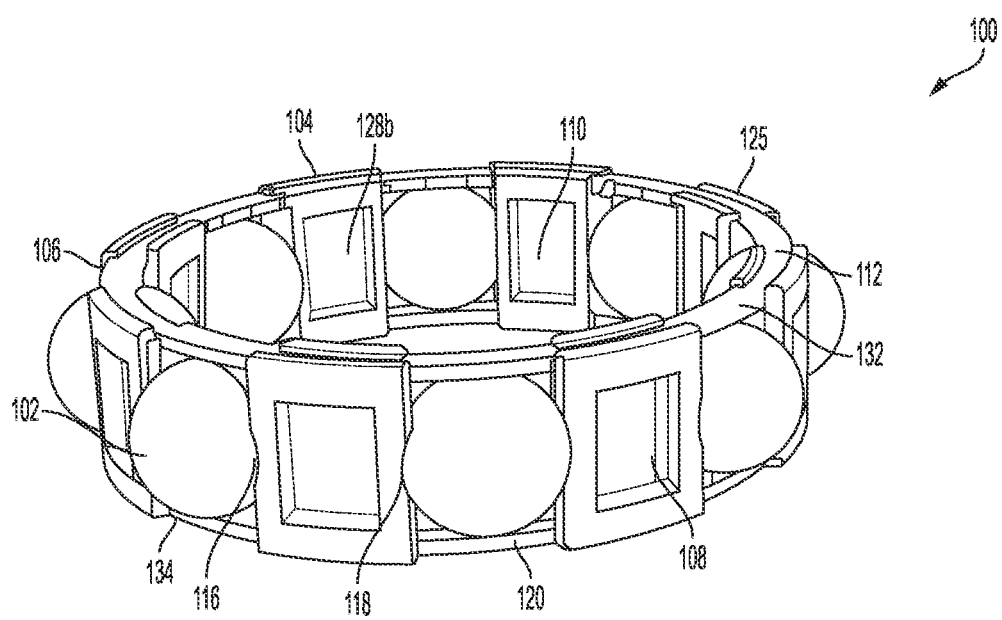
FIG. 2 shows another perspective view of the bearing assembly of FIG. 1.
Figure 3:
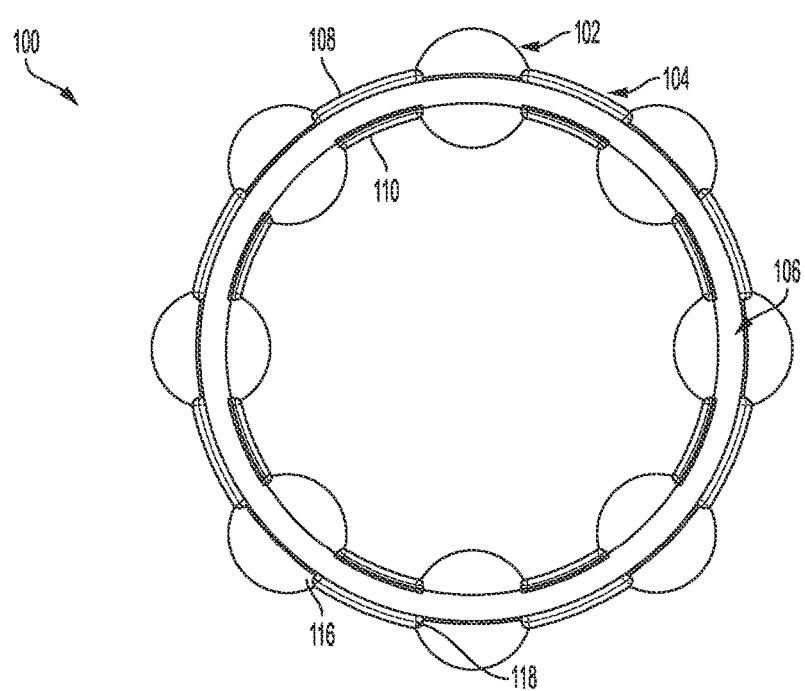
FIG. 3 shows a front view of the bearing assembly of FIG. 1.
Figure 4:
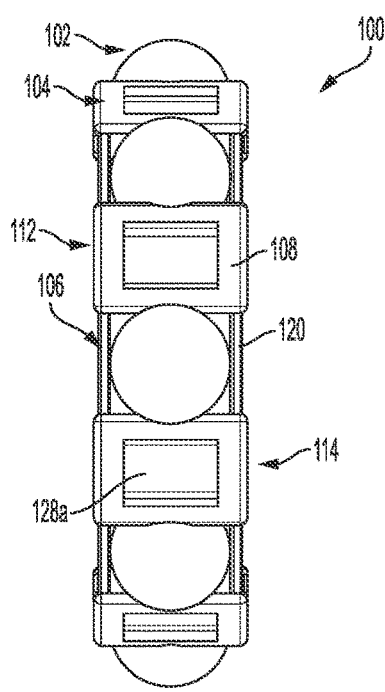
FIG. 4 shows a side view of the bearing assembly of FIG. 1.
Figure 5:
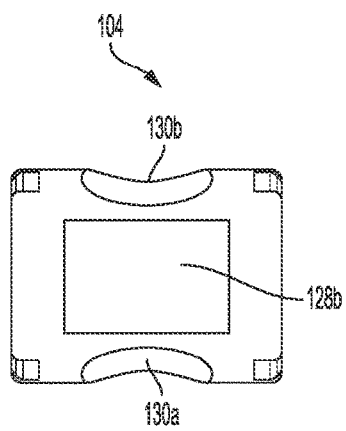
FIG. 5 shows a bottom view of a retention element of the bearing assembly of FIG. 1.
Figure 6:
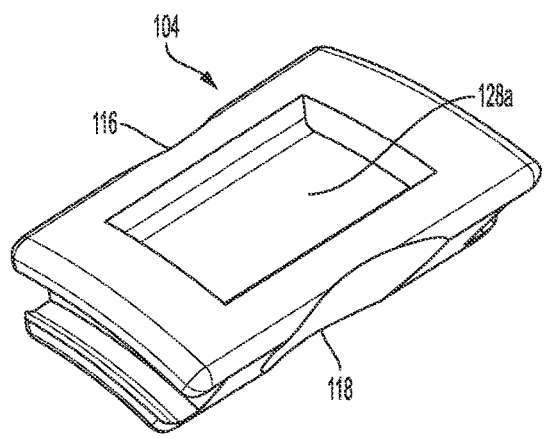
FIG. 6 shows a perspective view of the retention element of the bearing assembly of FIG. 1.
Figure 7:
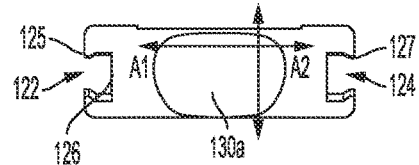
FIG. 7 shows a front view of the retention element of the bearing assembly of FIG. 1.

Reference will now be made to the drawings wherein like reference numerals identify similar structural features or aspects of the subject disclosure. For purposes of explanation and illustration, and not limitation, an exemplary embodiment of a bearing assembly in accordance with the disclosure is shown in FIG. 1 and is designated generally by reference character 100. Other aspects thereof, are provided in FIGS. 2-8, as will be described. The bearing assembly and components described herein allow for a bearing track cage, having individual retention elements coupled together to better handle pressures and stresses, and mitigate a rolling element excursion.

FIGS. 1-4 show a bearing assembly 100 which can be utilized in various high-speed applications. The bearing assembly 100 includes a plurality of spheres or rolling elements 102 held together by a plurality of retention elements 104, a first support 106 coupled to each of the retention elements 104 on a first axial side 112, and a second support 120 on a second axial side 114 of the retention element 104. The retention elements 104 can function as a cage crossbar or linkage between the first and second supports 106, 120. Each retention element 104 includes a radially outer side 108 that faces radially outward when the bearing is assembled and a radially inner side 110 that faces radially inward when the bearing is assembled. Each retention element 104 also includes a first circumferential side 116 and a second circumferential side 118. Each of the rolling elements 102 can be located between two adjacent retention elements 104 contacting the first circumferential side 116 of one retention element 104 and the second circumferential side 118 of the adjacent retention element 104, and contacting the first and second supports 106, 120. The retention elements 104 are configured to slide a full 360 degrees around along the first support 106 and the second support 120. The retention elements 104 can be made of a hardened plastic material, such as PA46-GF30 or PA66-GF25, and the first support 106 and the second support 120 can both be made of a metal such as steel. One of ordinary skill in the art would understand that the retention elements could also be molded from thermal plastics and the supports 106, 120 could be formed from low carbon steel such as SAE 1012 for coping with high rolling element excursion applications.

FIGS. 5-8 show detailed views of the retention element 104. The first axial side 112 and the second axial side 114 of each retention element 104 can include a slot 122 for receiving a respective one of the first support 106 or the second support 120. The first support 106 and second support 120 can be configured to snap into the slot 122. The slot 122 can include an opening 124 at an axially outer portion 127 of each retention element 104 that is narrower than an inner portion 126 of the slot 122, allowing the first support 106 and the second support 120 to be securely retained within the slot 122, while also allowing for circumferential movement. The retention element 104 can contact and cover up between 50% and 80% of an outer perimeter 132 of the first support 106 and an outer perimeter 134 of the second support 120, leaving the remaining portions of the respective outer perimeters exposed, allowing the retention elements 104 to slide along the supports 106, 120 (shown in FIG. 1) In one aspect, each slot 122 includes a pair of opposing arms or claws 125 defining the opening 124. The arms 125 are configured to retain the supports 106, 120 within the slot 122. The opening 124 should be greater than or equal to 80% of the height of slot 122 for easy installation of supports 106, 120. One of ordinary skill in the art would understand that various profiles or configurations for the slots 122 can be provided that generally provide a captively secure, but slidable connection to the supports 106, 120. The slot 122 can be arched with a curve extending from the first circumferential side 116 to the second circumferential side 118 to accommodate the first support 106 or the second support 120.

Figure 8:
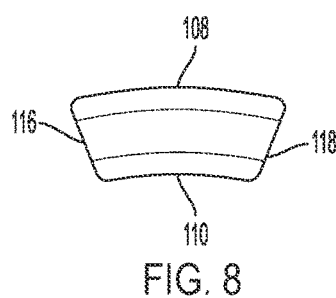
FIG. 8 shows a side view of the retention element of the bearing assembly of FIG. 1.

Referring further to FIGS. 5-8, the radially outer side 108 and the radially inner side 110 of the retention element 104 can be curved to match the curvature of the slot 122, the first support 106, and the second support 120. The first circumferential side 116 and the second circumferential side 118 can be arranged in a non-parallel relationship, where they converge towards each other in a direction from the radially outer side 108 to the radially inner side 110. As shown in FIG. 8, the first circumferential side 116 and the second circumferential side 118 can each taper inwardly in a radially inward direction. The radially outer side 108 can include a longer arch than the radially inner side 110, as measured from the first circumferential side 116 to the second circumferential side 118. Further, in order to minimize the required materials and weight of the bearing as well as reduce the centrifugal forces in high speed applications, the radially outer side 108 and radially inner side 110 of each of the retention elements 104 can include a cavity 128a and cavity 128b respectively. One of ordinary skill in the art would understand that these cavities 128a and 128b could be provided on just one of the radial sides 108, 110 in another configuration.

The first circumferential side 116 and the second circumferential side 118 of the retention element 104 can include an indentation 130a and 130b respectively. Indentations 130a and 130b of adjacent pairs of retention elements 104 that face each other define a rolling element pocket 105 which can accommodate the rolling element 102. The indentations 130a and 130b can be parabolically curved in a first axial side to second axial side direction (A1) and in a radially outer to radially inner side direction (A2). Each of the indentations 130a and 130b can span from a portion of the respective side whereby the indentation 130 contacts and includes the radially outer side 108 and the radially inner side 110. One of ordinary skill in the art would understand that the indentations 130a and 130b can have various shapes or sizes, depending on the desired contact with the associated rolling elements 102. The indentations 130a and 130b are shaped such that the rolling elements 102 contact the retention elements 104 at within the indentations 130a and 130b during the rolling element excursion. Since the retention element 104 can shift circumferentially under rolling element 102 pressure, stress on the bearing assembly 100 is reduced and cage failures are less likely to occur.

The combination of the retention elements and supports mentioned above, provides for individual retention elements that define the rolling element pockets of a bearing track cage that allows the rolling elements and retention elements to shift circumferentially together to reduce stress and mitigate excursion. While the bearing track cage and bearing assembly of the subject disclosure has been shown and described with reference to preferred embodiments, those skilled in the art will readily appreciate that changes and/or modifications may be made thereto without departing from the scope of the subject disclosure.

LISTING OF PARTS

Bearing assembly 100
Rolling elements 102
Retention elements 104
Pocket 105
First support 106

Retention element radially outer side 108
Retention element radially inner side 110
Retention element first axial side 112
Retention element second axial side 114
Retention element first circumferential side 116
Retention element second circumferential side 118
Second support 120
Slot 122
Slot opening 124
Slot arms 125
Slot inner portion 126
Slot outer portion 127
Cavities 128*a*, 128*b*
Indentations 130*a*, 130*b*

What is claimed is:

1. A bearing track cage comprising:
a plurality of retention elements, wherein each retention element of the plurality of retention elements includes at least a first axial side and a second axial side, and wherein each adjacent pair of retention elements of the plurality of retention elements defines a rolling element pocket configured to retain a rolling element;
a first support slidably coupled to each of the plurality of retention elements on the first axial side thereof; and
a second support slidably coupled to each of the plurality of retention elements on the second axial side thereof;
wherein the first support and the second support are configured to contact each of the rolling elements.

2. The bearing track cage of claim 1, wherein the first axial side and the second axial side of each retention element of the plurality of retention elements includes a slot configured to retain a corresponding one of the first support or the second support.

3. The bearing track cage of claim 2, wherein each slot is larger at an axially inner portion than at an opening defined at an axially outer portion.

4. The bearing track cage of claim 2, wherein each slot includes a curved profile elongated from a first circumferential side of the retention element to a second circumferential side of the retention element.

5. The bearing track cage of claim 1, wherein the plurality of retention elements contact at least 50% of an outer perimeter of the first support and contact at least 50% of an outer perimeter of the second support.

6. The bearing track cage of claim 1, wherein the plurality of retention elements contact less than 80% of an outer perimeter of the first support and contact less than 80% of an outer perimeter of the second support.

7. The bearing track cage of claim 1, wherein a first circumferential side of each of the plurality of retention elements includes a first indentation partially defining an adjacent rolling element pocket.

8. The bearing track cage of claim 7, wherein a second circumferential side of each of the plurality of retention elements includes a second indentation partially defining the adjacent rolling element pocket.

9. The bearing track cage of claim 8, wherein the first indentation and the second indentation contact a radially outer side of each retention element.

10. The bearing track cage of claim 9, wherein the first indentation and the second indentation contact a radially inner side of each retention element.

11. The bearing track cage of claim 8, wherein the first indentation and the second indentation are each defined by a spheroidal curve.

12. The bearing track cage of claim 1, wherein at least one of a radially outer side or a radially inner side of each of the plurality of retention elements includes a cavity.

13. The bearing track cage of claim 12, wherein the radially outer side includes a first cavity and the radially inner side includes a second cavity.

14. The bearing track cage of claim 1, wherein the first support and the second support are each formed from a metal and each retention element of the plurality of retention elements are formed from a plastic material.

15. A bearing assembly comprising:
a plurality of rolling elements; and
a plurality of retention elements, wherein each of the plurality of retention elements is located between adjacent rolling elements of the plurality of rolling elements, wherein the plurality of retention elements are configured to be slidably coupled to at least a first support such that each of the plurality of retention elements are configured to shift in a circumferential direction along the first support; wherein each of the plurality of retention elements are configured to be slidably coupled to at least a second support, and wherein the first support and the second support are configured to contact each of the rolling elements.

16. The bearing assembly of claim 15, wherein the plurality of rolling elements are free to shift circumferentially within the bearing assembly.

17. The bearing assembly of claim 15, wherein each of the retention elements are configured to cover the first support and the second support.

18. The bearing assembly of claim 17, wherein each of the retention elements are configured to at least partially expose the first support and the second support.

\* \* \* \* \*